United States Patent [19]

Askman et al.

[11] 4,026,015

[45] May 31, 1977

[54] HEAT-SHRINKABLE MOLDED HIGH VOLTAGE CONNECTOR

[75] Inventors: Jan Philip Askman, Carlisle; George Warren Wolverton, Elizabethtown, both of Pa.

[73] Assignee: AMP Incorporated, Harrisburg, Pa.

[22] Filed: Mar. 29, 1976

[21] Appl. No.: 671,877

Related U.S. Application Data

[62] Division of Ser. No. 570,128, April 21, 1975, Pat. No. 3,963,295.

[52] U.S. Cl. .................................. 29/629; 29/447; 29/630 A; 264/272

[51] Int. Cl.² ....................................... H02G 15/00

[58] Field of Search ............. 29/629, 630 R, 630 A, 29/447; 339/59, 60, 61, 89, 94, 101, DIG. 1; 174/DIG. 8; 264/271, 272, 230, 275, 255, DIG. 71

[56] References Cited

UNITED STATES PATENTS

| | | | |
|---|---|---|---|
| 1,998,356 | 4/1935 | Brown | 264/230 X |
| 3,157,449 | 11/1964 | Hennessey | 264/230 X |
| 3,193,792 | 7/1965 | Shea | 339/DIG. 1 |
| 3,226,463 | 12/1965 | Wallace | 264/272 |
| 3,372,462 | 3/1968 | Reid et al. | 264/230 X |
| 3,423,518 | 1/1969 | Weagant | 339/DIG. 1 |
| 3,526,683 | 9/1970 | Heslop et al. | 264/230 X |
| 3,550,064 | 12/1970 | Caller et al. | 339/DIG. 1 |
| 3,851,296 | 11/1974 | Muchmore et al. | 339/60 M |
| 3,891,790 | 6/1975 | Kierstead | 264/272 |

*Primary Examiner*—James R. Duzan
*Attorney, Agent, or Firm*—Gerald K. Kita

[57] ABSTRACT

The invention relates to an electrical connector for a high voltage electrical lead terminated to an electrical contact and a method for making the same wherein the connector includes a silicone rubber receptacle insertably receiving and surrounding the contact to prevent arcing thereof together with a dielectric tube having a section secured within the receptacle and being preshrunk to conform in shape to that of the electrical contact. A heat-shrinkable section of the tube projects from the receptacle and is heat-shrinkable to conform sealably around the electrical lead.

2 Claims, 3 Drawing Figures

HEAT-SHRINKABLE MOLDED HIGH VOLTAGE CONNECTOR

This is a division of application Ser. No. 570,128, filed Apr. 21, 1975, now U.S. Pat. No. 3,963,295.

BACKGROUND OF THE PRIOR ART

This invention relates to a field installable connector for high voltage leads. It is often desirable to provide a high voltage electrical lead with a connector which is readily assembled from its component parts and installed on the lead without a need for special tooling or complex assembly procedures. A desirable assembly procedure would involve terminating the electrical lead with an electrical contact and then inserting the terminated lead and contact within the confines of a connector having suitable dielectric properties adequately protecting the contact and terminated lead from arcing, whether the connector is mated or in a unmated condition, and wherein the connector also suitably conforms sealably in encirclement over the terminated lead and contact.

SUMMARY OF THE INVENTION

The present invention achieves the above stated objectives sought in the prior art by providing a molded silicone rubber dielectric sheath or receptacle which is molded to conform in shape to an insertable electrical lead. The receptacle is molded integrally with a dielectric tube having a first section molded and secured within the receptacle and also conforming in shape to that of an insertable electrical lead. The tube further includes a heat-shrinkable section projecting outwardly from the receptacle and having a diameter relatively large enough to permit free insertion of the contact and high voltage electrical lead terminated with the contact. The heat-shrinkable section is then shrunk in sealing conformation over the lead. The tube section which is molded within the receptacle is advantageously pre-shrunk, for example, over a mandrel to achieve the desired shape of conformation to that of the electrical contact.

OBJECTS

It is accordingly an object of the present invention to provide an electrical connector for a high voltage electrical lead terminated to an electrical contact, the connector having a dielectric sheath forming a receptacle for insertably receiving and surrounding the contact and a dielectric tube secured to the sheath and heat-shrinkable for sealed encircling conformation on the lead.

Another object of the present invention is to provide a silicone rubber receptacle for an electrical contact with an integral dielectric tube which is heat-shrinkable to conform sealably around an electrical lead and wherein a section of the tube is secured with the receptacle and is pre-shrunk to conform in shape to that of the electrical contact which is terminated to the lead and then freely inserted within the receptacle.

Another object of the present invention is to provide an electrical connector with a heat-shrinkable dielectric tube having a receptacle section which is pre-shrunk to conform in shape to that of an insertable electrical contact and which is molded within a dielectric sheath forming a receptacle surrounding the contact to prevent arcing thereof.

Another object of the present invention is to provide a method for making an electrical connector having a dielectric portion molded to a pre-shrunk section of a tube having a heat-shrinkable section projecting from the dielectric portion.

Another object of the present invention is to provide a method of making an electrical connector for a high voltage electrical lead terminated to an electrical contact wherein the connector includes a dielectric receptacle for the contact with an integral dielectric tube which is heat-shrinkable to conform sealably around an electrical lead and wherein a section of the tube is secured in the receptacle and is pre-shrunk to conform in shape to that of the electrical contact which is terminated to the lead and freely insertable within the receptacle.

DESCRIPTION OF THE PREFERRED EMBODIMENT

Figure 1:
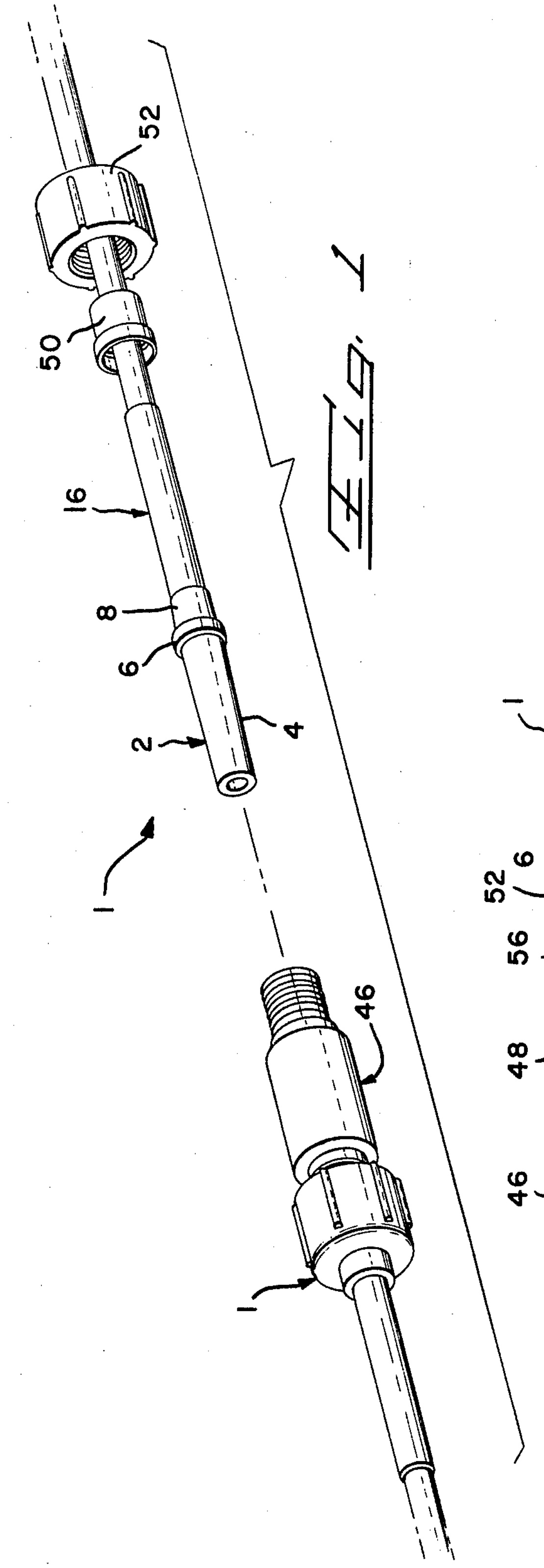
FIG. 1 is an enlarged fragmentary perspective of a preferred embodiment of the present invention with the component parts thereof illustrated in partially assembled configuration.
Figure 2:
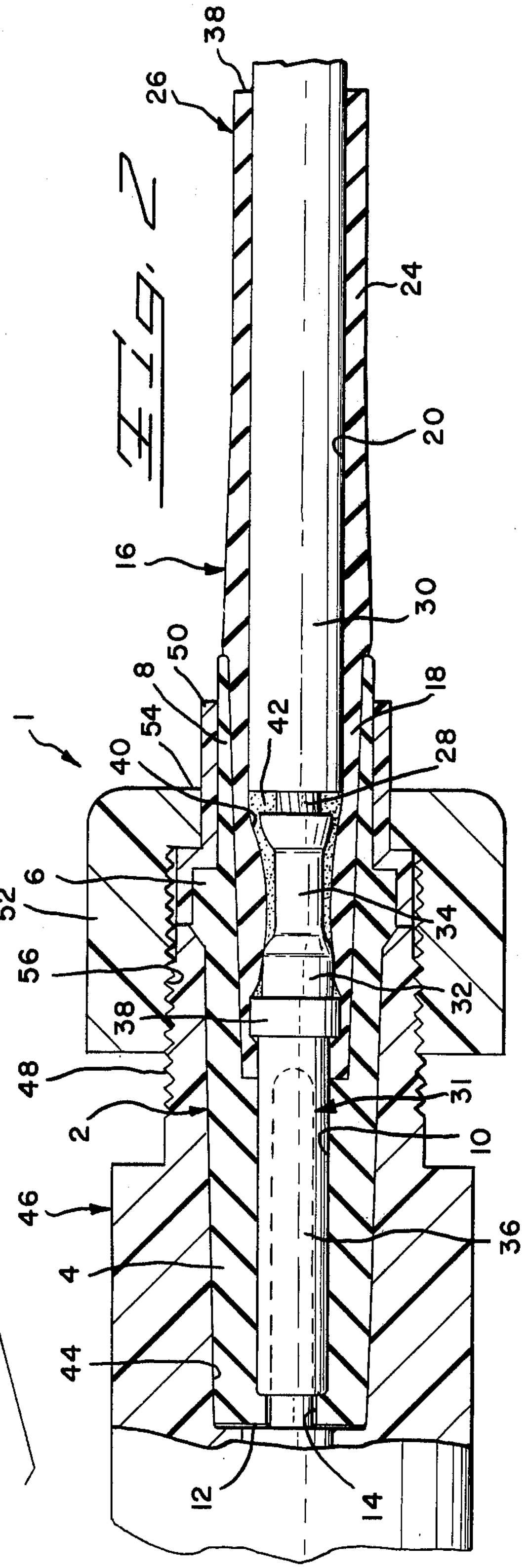
FIG. 2 is an enlarged fragmentary elevation in section illustrating the fully assembled component parts of the embodiment shown in FIG. 1.

With more particular reference to FIGS. 1 and 2, there is shown generally at 1 a preferred embodiment of a connector according to the present invention. The connector includes a sleeve or sheath 2 of dielectric such as silicone rubber molded to an elongated tapered sleeve or tubular configuration at its forward portion 4. An integral externally projecting annular collar or flange 6 is formed between the forward portion 4 and a rearward cylindrical portion 8 of the sheath 2. The sheath includes an internal generally cylindrical cavity 10 terminating at a forward end wall 12 provided therethrough with an aperture 14 of reduced diameter and in alignment with and communicating with the cavity 10. The connector further includes an elongated tube or sleeve 16 of heat-shrinkable dielectric having a forward section 18 secured within the sheath 2. An internal opening 20 throughout the length of the tube thus is in alignment with and communicates with the cavity 10. A rearward section 24 of the tube 16 projects outwardly of the rearward end portion 8 of the sheath. An electrical lead is shown generally at 26 and includes an electrical conductor or wire 28 provided thereover with an encircling sheath of insulation 30 such as silicone rubber. It is to be understood however that any suitable dielectric such as Teflon also may be used as the dielectric sheath 30. A portion of the sheath 30 is stripped away to expose an end portion of the conductor 28. The exposed conductor 28 is then terminated with an electrical contact generally illustrated at 31. The contact includes a rearward portion 32 which is generally cylindrical and hollow to form a wire barrel insertably receiving the exposed end portion 28 of the conductor 28. The conductor is terminated to the wire barrel portion by crimping at 34. The contact 30 further includes an elongated hollow cylindrical forward end portion 36 with an external integral annular collar 38 between the rearward portion 32 and the forward portion 36.

In the assembly of the device, the lead 26 is terminated with the contact 30 as described. The terminated lead and contact are then coated thereover with a thin layer of a suitable dielectric adhesive such as silicone RTV. The contact and terminated lead are then freely insertable through the end 38 of the tube 16 until the cylindrical forward end portion 36 of the contact 30 registers within the cavity 10 and is seated against the bottom wall 12 of the sheath 2. It is noted that the tube interior initially is larger than the transverse dimensions of the contact and lead. The length of the contact is entirely within the confines of the sheath 2 which serves as a receptacle freely insertably receiving the contact 30 therein. The forward portion 4 of the sheath 2 may be molded rather precisely in conformity and in encirclement around the forward portion 36 of the contact 30. In addition the sheath 2 may be molded from silicone rubber which is highly rubbery, soft and resilient in order to freely receive the insertable contact 30 and yet readily conform to the outer periphery thereof. The end wall 12 insures surrounding of the contact with the dielectric sheath to prevent touching or close proximity of the contact with any object across which an arc might be substained when the lead is energized and when the connector is in either its mated or unmated condition. It is further noticed that the forward end portion 18 of the tube 16 is of reduced diameter with respect to the heat-shrinkable rearward end portion 24 thereof. The forward portion 18 may be pre-shrunk into conformity with the anticipated external shape of the insertable contact 30 prior to securing of the forward end portion 18 within the sheath 2. Since the forward end portion 18 is not as resilient as the silicone rubber sheath 2, there is anticipated that some clearance or space 40 will occur and be defined between the contact 30 and the inner wall 20 of the forward end portion 18 of the tube 16. However such clearance or space will become filled with the silicone RTV 42 which has been coated on the terminated contact 30 prior to its insertion within the connector. More particularly the silicone RTV 42 applied to the contact 30 in liquid form serves as a lubricant permitting insertion of the contact within the sheath 2. Such insertion procedure causes extrusion of the liquid silicone RTV into the clearance 40 thus filling the clearance 40 thereof. Upon curing the silicone RTV will remain solidified in the clearance further serving as a dielectric intending to sealably conform to the shape of the contact 30 and the exposed conductor 28. The rearward portion 24 of the tube 16 is then shrunk into sealed conformity and in encirclement around the terminated lead. Some of the silicone RTV will remain within the confines of the rearward portion 24 of the tube 16 and will thereby serve as a sealant upon curing. However if desired, the rearward portion 24 may also be provided with a sealant coating on the interior defining the opening 20 thereof prior to insertion of the terminated lead and contact 30. The sealant may be heat meltable to provide a sealant which flows when the tube is heat shrunk. To complete the assembly, the sheath 2 may be inserted within a complementary tapered recess 44 of a rigid dielectric shell 46. A rearward portion 48 of the shell is externally threaded and forms a seat against which the collar 6 is seated. A stepped annular ring 50 is freely received over the rearward portion 8 and over the exposed part of the collar 6 which projects outwardly of the rearward portion 48 of the shell. An enlarged ring 52 having a radially inward directed annular flange 54 captures the enlarged part of the stepped ring 50. A forward end portion of the ring 52 is internally threaded at 56 and is threadably advanced over the rearward end portion 48 of the shell 46. The annular collar 6 of the sheath 2 is thereby compressed between the stepped ring 50 and the rearward portion 48 of the shell 46 thereby forming a seal at the interface between the shell 46 and the dielectric sheath 2. As shown the connector 1 includes only a single terminated lead 26. It is however to be understood that the shell 46 may be provided with any desired number of cavities 44 into which may be connected a corresponding plurality of leads 26 to form a multiposition connector 1.

Figure 3:
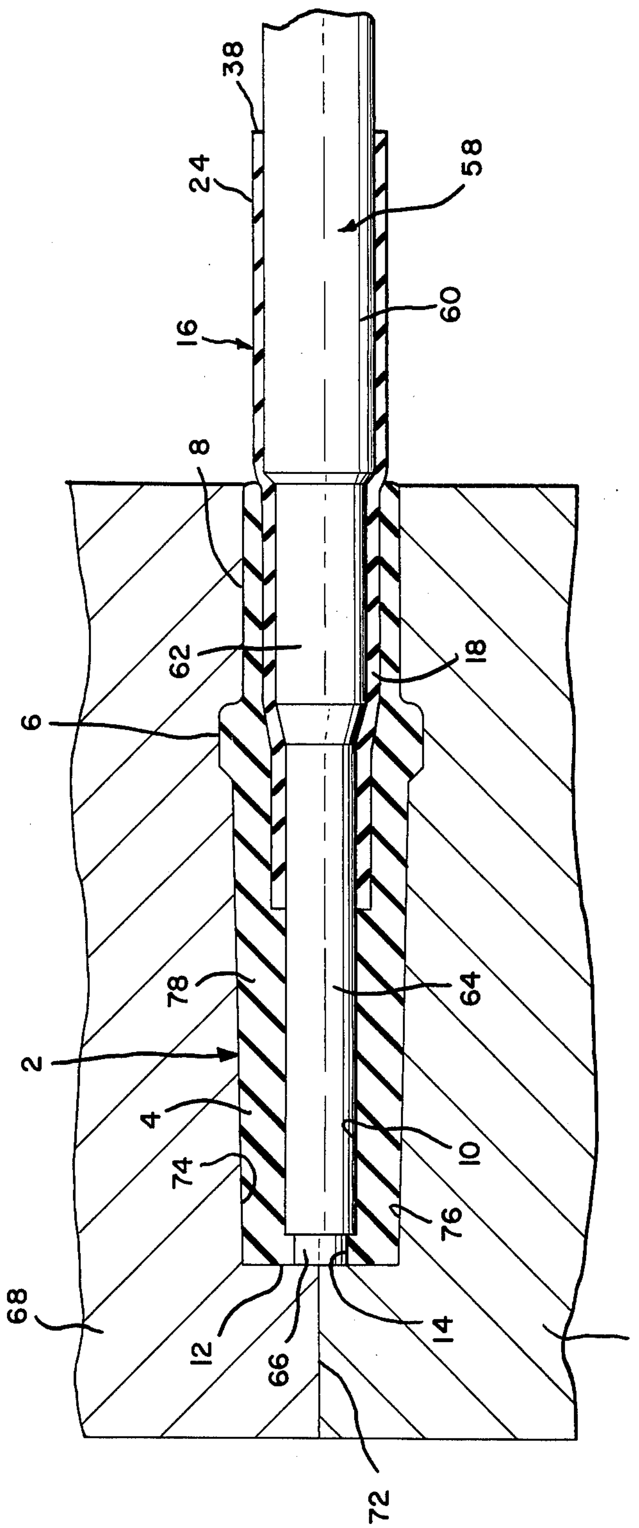
FIG. 3 is an enlarged fragmentary elevation in section illustrating the manufacture of selected component parts of the connector according to the present invention.

With more particular reference to FIG. 3, the manufacture of the sheath 2 and tube 16 will be described in detail. It was found advantageous that the tube 16 be cut to selected length from a tube of heat-shrinkable material which would allow pre-shrinking of the forward portion 18 thereof without damaging the heat-shrinkable properties of the rearward portion 24 thereof. This would allow the forward portion 18 to be pre-shrunk over a mandrel 58 separately from the subsequent shrinking of the rearward portion 24 in conformity over the lead 26. Such a material was found to be a commercially available silicone shrinkable material. The mandrel 58 is provided with an enlarged cylindrical rearward portion 60 having a diameter which is larger than the diameter of the insulation 30 and which retains the rearward portion 24 of the tubing in its radially expanded configuraion in order to retain the heat-shrinkable properties thereof. The mandrel portion 60 is stepped down to a relatively reduced intermediate diameter portion 62 which in turn is stepped down to an elongated reduced cylindrical portion 64, in turn stepped down to a reduced diameter tip 66. As shown in FIG. 3 the forward portion 18 of the tube 16 completely encircles the portion 62 of the mandrel and partially encircles the portions 64 and 60 of the mandrel. The forward section 18 of the tube 16 is then shrunk by the application of heat to conform to the mandrel portions 62, 64 and 60. The portion 62 of the mandrel is of an outer diameter conforming to the outer diameter of the collar 38 of the contact 30. The mandrel portion 64 is of a diameter and length conforming or corresponding to that of the portion 36 of the contact 30. Thus the tube section 18 is pre-shrunk in conformity with the outer dimensions of an electrical contact expected to be inserted within the tube 16 and therefore within the connector 1. The mandrel 58 together with the section 18 of the tube 16 is then located between a pair of molding dies 68 and 70 which close together at a parting line 72. Each of the die portions 68 and 70 are provided with corresponding mating cavities 74 and 76 into which is injected silicone rubber 78 which forms the forward portion 4, the rearward portion 8 and the collar 6 of the sheath or receptacle 2. The silicone is thus injection molded around the corresponding mandrel portions to form the end wall 12, the aperture 14 and the internal cavity 10. In addition the silicone rubber is injection molded around the pre-shrunk section 18 of the tube thereby integrally molding the sheath or receptacle portion 2 to the section 18 of the tube 16.

Upon removal of the component parts 2 and 16 from the dies, followed by removal of the mandrel 58, the completed sheah or receptacle 2 and tube 16 is suitable for assembly into the connector 1. Due to the resiliency of the silicone, the collar 38 can be force-fit within the sleeve section 18, creating the distortion thereof as shown in FIG. 2.

According to a modification of the process, the rearward end portion 8 of the silicone receptacle may be fabricated from a ring or a wrapped ribbon of silicone encircling the sleeve section 18 which has been preshrunk into conformity with the mandrel portion 62. The ring or ribbon thus forms a silicone insert placed with the sleeve section 18 within the dies 68 and 70. When the remainder of the silicone receptacle is injection molded, the insert then becomes fusibly joined to the injected silicone to form a unitary, one-piece silicone receptacle 2.

What has been shown and described is a preferred embodiment of the present invention. Other modifications and embodiments of the present invention which would be apparent to one having ordinary skill in the art are intended to be covered by the spirit and scope of the appended claims.

What is claimed is:

1. A method of manufacturing an electrical lead, comprising the steps of:

cutting to selected length a section of heat-shrinkable tubing, placing said tubing over a mandrel having the shape of an electrical contact, shrinking a portion of said tubing to conform to the shape of said mandrel and leaving the remainder of said tubing in unshrunk condition, molding a sleeve of silicone rubber over the shrunk portion of said tubing and bonding the sleeve to said shrunk portion of said tubing to provide an electrical receptacle, and removing said mandrel whereby the unshrunk portion of said tubing may freely receive an electrical lead and an electrical contact therein, and further whereby the unshrunk portion of said tubing may be shrunk into gripped relation over said lead with the contact received in said receptacle formed by said silicone sleeve.

2. The method of claim 1 and further including the steps of:

providing a silicone insert in encirclement over said shrunk portion of said tubing, and fusing said sleeve of silicone rubber to said insert during molding of said sleeve to provide a unitary silicone structure forming said receptacle.

* * * * *